(12) United States Patent
Sidqi

(10) Patent No.: US 6,555,604 B1
(45) Date of Patent: Apr. 29, 2003

(54) PIGMENT FOR WARPAGE-FREE POLYOLEFINS COLORATION

(75) Inventor: Mohamed Sidqi, Brunstatt (FR)

(73) Assignee: Clariant Finance (BVI) Limited, Tortola (VG)

( * ) Notice: Subject to any disclaimer, the term of this patent is extended or adjusted under 35 U.S.C. 154(b) by 253 days.

(21) Appl. No.: 09/649,531

(22) Filed: Aug. 28, 2000

(30) Foreign Application Priority Data

Aug. 31, 1999  (GB) ............................................... 9920445

(51) Int. Cl.[7] ................................................ C08K 5/34
(52) U.S. Cl. ...................................................... 524/103
(58) Field of Search ......................................... 524/103

(56) References Cited

U.S. PATENT DOCUMENTS 5,116,976 A * 5/1992 Myers ........................ 546/20

OTHER PUBLICATIONS

U.S. patent application Ser. No. 09/637,541, filed Aug. 11, 2000, Bansi Lal Kaul et al.

* cited by examiner

*Primary Examiner*—Peter D. Mulcahy
(74) *Attorney, Agent, or Firm*—Anthony A. Bisulca

(57) ABSTRACT

Use of a pigment of formula (I)

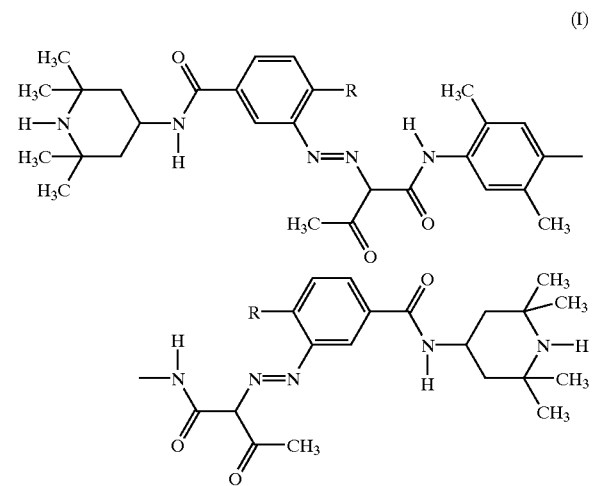

where both R are Cl or $COOCH_3$ for the coloration of polyolefins which do not warp.

3 Claims, No Drawings

PIGMENT FOR WARPAGE-FREE POLYOLEFINS COLORATION

This invention relates to the use of a pigment for the warpage-free coloration of polyolefins.

Unexpected shrinkage and warpage problems can occur when organic pigments are used for the coloration of polyolefins, especially high density polyethylene. This may be due to changes in crystallization behavior due to the presence of pigments. A number of studies have shown that pigments can affect both the size of the crystallites and the rate of crystallization by acting as nucleating agents, inducing crystallization at higher temperatures than expected.

All these aspects have an important commercial issue. For example the coloration of bottle crates is a very important market for a pigment producer. A pigment has to fulfill an important condition when used in high density polyethylene application: it must not influence the crystallization process of the polymer. Such an influence can cause shrinkage or warpage, showing deformations of the injected article and deterioration of the mechanical properties.

In order to avoid this problem, when using organic pigment for the coloration of polyolefins, surface treatments have been developed in order to modify the surface of the pigment precipitation on the surface of the organic particles of a thin layer of a metal oxide (e.g. zirconium, silicium or aluminium) or adsorption or precipitation of some polar polymers (polyacrylates or cellulose derivatives) on the pigment surface. However these treatments are not always efficient.

It has now been found that light stabilizing azo-pigments of formula (I) do not provoke warpage when used in high density polyethylene

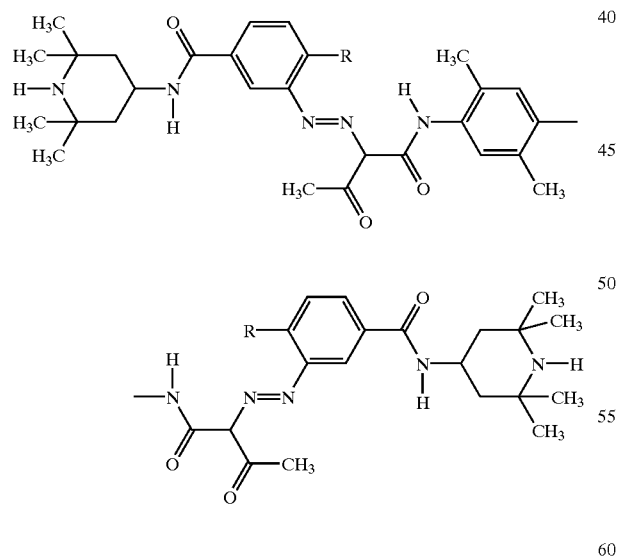

where both R are Cl or COOCH$_3$.

The invention, therefore, resides in the use of a pigment of formula (I) for the coloration of polyolefins which do not warp and provides warpage-free polyolefins, more preferably high density polyethylene (HDPE), which have been colored with a pigment of formula (I).

When coloring polyolefins with a pigment of formula (I) the usual amounts can be used, i.e. from 0.01 to 30% by weight, preferably from 0.1 to 10% by weight based on the material to be colored.

EXPERIMENTAL PART

The testing method is the following:

Injection mould 10 test plates 60×60 mm in HDPE with and without 0.1% pigment processing temperature 220° C. and 280° C.

result: difference of the length and width measurement between test plates in natural HDPE and in HDPE colored with 0.1% pigment.

% FV=(% vertical shrinkage−% horizontal shrinkage)/(% horizontal shrinkage)×100%

% FV=0–10%: good
% FV=10–20%: suitable
% FV>20%: unsuitable

|  | % FV at 220° C. | % FV at 280° C. |
|---|---|---|
| R = Cl | 12.29 | 12.74 |
| R = COOCH3 | 8.21 | 1.81 |

With the pigment of formula (I) an excellent result is obtained regarding warpage of the test plates.

What is claimed is:

1. A method for the coloration of a polyolefin which does not warp comprising the step of adding to the polyoefin a pigment of formula (I)

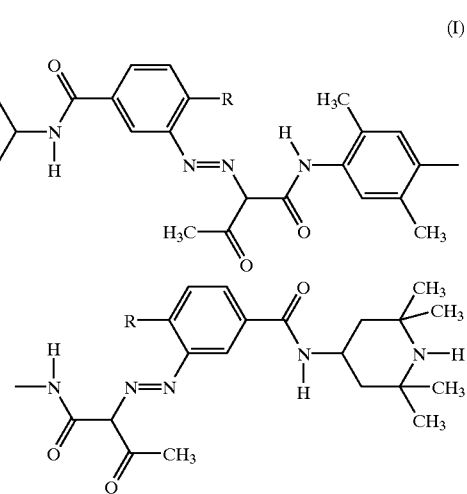

where both R are Cl or COOCH$_3$.

2. A warpage-free polyolefin comprising a pigment of formula (I)

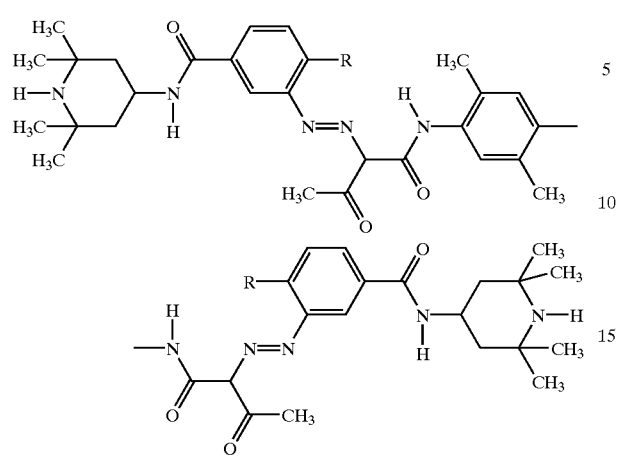
where both R are Cl or COOCH$_3$.
3. High density polyethylene (HDPE) which does not warp comprising a pigment of formula (I)
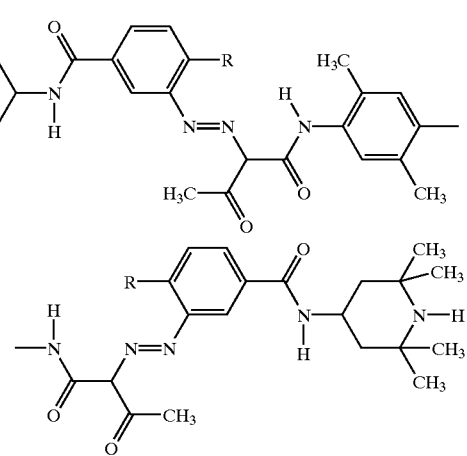
where both R are Cl or COOCH$_3$.
* * * * *